United States Patent Office 3,321,320
Patented May 23, 1967

3,321,320
IRON BUTOXIDE IMPROVED POLYHYDRIC PHENOL MODIFIED ALKYD COMPOSITIONS
Raymond Noel Faulkner, Hanworth, Middlesex, and Leonard Alfred O'Neill, Hampton Hill, Middlesex, England, assignors to the United States of America as represented by the Secretary of Agriculture
No Drawing. Filed Mar. 25, 1965, Ser. No. 442,831
10 Claims. (Cl. 106—14)

ABSTRACT OF THE DISCLOSURE

Alkyd primer coatings for steel exhibit improved cure and resistance to corrosion when a small amount of iron butoxide is incorporated in ethylene glycol monoethyl ether or mixed ethylene glycol monoethyl ether/naphtha solutions of the alkyd prior to application to a clean steel surface.

---

A nonexclusive, irrevocable, royalty-free license in the invention herein described, throughout the world for all purposes of the United States Government, with the power to grant sublicenses for such purposes, is hereby granted to the Government of the United States of America.

This invention relates to complex-forming metal coating compositions comprising organic solvent solutions of iron-reactive polyhydric phenol-modified vegetable oil alkyds, epoxy esters, or polyamides also containing iron butoxide as an additive for improving the evenness of coloration and curing as well as other properties of the coating when applied to abraded mild steel or iron.

Applicants copending application, S.N. 367,262 filed May 13, 1964, and entitled "Polyhydric Phenol-Modified Fatty Media and Iron Surfaces Chelated Therewith," now U.S. Patent No. 3,304,276, the disclosure of which is incorporated by reference, teaches that anticorrosive protection is given to mild steel that is primed with solutions of novel iron-reactive polyhydric phenol-modified vegetable oils and similarly modified oil based alkyd resins, which polyhydric phenol modified media, preferably the gallates, react with the metal surface to form novel organometallic complexes or chelates that are soluble in the uncured coatings into which they then diffuse and wherein the said complexes catalyze crosslinking of the resin constituent to provide hard, reasonably durable films whose residual polyhydric phenol groups apparently inhibit corrosion of the underlying metal, thereby making the said compositions useful, for example, as primers for protecting steel during storage prior to welding.

Perhaps because of poorer wetting tendencies or insufficiently rust-free surfaces to be coated, some of the gallate-modified resins are somewhat prone to be erratic in their reactions with mild steel as indicated by the uneven or even blotchy development of the blue-black color that denotes formation of the diffusible complex and by the resulting incomplete cures to tacky rather than to dry films. Although the uneven or blotchy development of the deeply blue-black complexes and the incomplete curing of the coatings can be improved by adding to the primer composition at least about 1 percent based on the resin solids of a promoter such as acetic acid or dibutyl phosphate, this amount is not effective for promoting in situ reaction with the mild steel surface in all cases.

The principal object of the instant invention is a means of improving the primer compositions described and claimed in our U.S. Patent No. 3,304,276 whereby the thereby improved primers react evenly with a mild steel substrate to form the diffusible blue-black complex in amounts sufficient to cure the primer coating to an adherent nonpowdery, smooth, dry film. Another object is the preparation of pigment-containing anticorrosive coatings, i.e., paints, comprising the gallate modified vegetable oil based resins, which paints cure in the same manner and have properties practically identical with those of the unpigmented primer compositions.

In accordance with the above general objects of this invention we have now discovered that the shortcomings peculiar to certain of the polyhydric phenol-modified vegetable oil based primer media of U.S. Patent No. 3,304,276 are overcome by incorporating in the coating composition at least about 1 percent and up to 3 percent by weight of iron butoxide based on the resin content, although additions of up to 13 percent are operative where the resin has an unusually high content of polyhydric phenol groups, e.g., pyrogallol-modified linseed oil.

The addition of an essentially catalytic amount (from 1 to generally about 3 percent based on the resin content) of iron butoxide to the above mentioned polyhydric phenol-modified vegetable oil based alkyd or glycidyl ether primer or pigment-containing compositions before application to rust-free iron or steel surface evenly promote the in situ formation of a diffusible organometallic curing catalyst that provides adherent nontacky films that do not flake off. About 1 percent of acetic acid promoter may optionally be added to compositions containing about 1 percent iron butoxide, but at an iron butoxide level of 3 percent the acetic acid tends to promote a too rapid reaction with the mild steel substrate, and thereby result in powdery or matte, i.e., dull coatings.

The following specific examples and tables are intended to illustrate our invention without limiting the claims thereto inasmuch as those skilled in the art will readily perceive adjustments and alterations that do not depart from the spirit of the invention.

Example 1

To a solution of 36 g. of (3:1) linseed/tung-modified phthalic glycerol alkyd in 34 g. of xylol were added 6 g. of propyl gallate. The mixture was heated at 210° C. under reflux for a few minutes to provide a homogenous solution and then cooled momentarily to permit the addition of 0.1 ml. of titanium isopropoxide catalyst dissolved in 15 ml. xylol. With periodic shaking, the reactants were refluxed at 210° C. for about 4 hours, the resulting propyl alcohol being segregated. The gallate modified reaction product was dissolved in 250 ml. xylol. Since no precipitation occurred on standing overnight, the xylol was distilled off under vacuum to give 40 g. of a gummy product 25 g. of which was then dissolved in a mixture of 50 ml. ethylene glycol monoethyl ether and 50 ml. of high boiling naphtha. Iron butoxide, 0.75 g. (3% based on the weight of the alkyd solids), prepared by the process of U.S. Patent No. 2,789,923 and analyzing 22.4 Fe, was added to the alkyd solution which was then applied by brush to emery abraded mild steel and to glass panels, the thickness of the subsequently cured dry films being about ⅓ mil. Although the coatings on both substrates become blue-black, those on the steel panels cured much more quickly and completely. Evaluations of the coated steel panels are shown in Table I and the results of comparative tests against two commercial primers, viz a polyvinyl butyral/chromate wash primer and an epoxy/polyamide zinc rich primer on grit blasted steel panels (12″ x 8″) are shown in Table II.

Example 2

Pigmented systems were prepared by milling 0.5 g., 2.0 g., or 2.5 g. of micronized $Fe_2O_3$ (i.e., 10%, 40%, or 50% based on the alkyd solids) with 20 ml. of the 25-percent solution of gallate modified alkyd of Example 1 in a 1:1 glycol ether/naptha mixture and containing 0.15 g. of iron butoxide. Coatings were brushed onto emery abraded steel but the paints with the higher pigment concentrations required thinning with ethylene glycol monoethyl ether. The 50-percent pigmented coating dried rapidly to a superficially powdery film; the 40-percent and 10-percent pigmented media yielded tack-free, red-blue coatings which hardened on aging. The coatings are evaluated in Table III. The coatings had very good adhesion and resistance to water, ethylene glycol ether, and to high boiling naptha. Similar results were obtained for the coatings produced from the corresponding systems also containing additions of about 1 percent of acetic acid for promoting the formation of the diffusible complex.

*Example 3*

A gallate modified hydroxylated triglyceride oil was prepared by reacting castor oil (21 g., approximately 0.02 mole) with propyl gallate (10 g., 0.055 mole) for 1½ hours at 220–230° C. in the presence of 0.1 ml. titanium isopropoxide, about 1.5 g. of a light brown distillate comprising roughly equal parts of water and methanol being collected in the receiver and removed. Extraction of the nonvolatile residue with three 50 ml. volumes of high boiling petroleum ether gave 4 g. of a liquid extract and residue which then was extracted with chloroform, the latter solution filtered to remove 2 g. of unreacted solid methyl gallate, 21.5 g. of darkly colored gallate modified castor oil then being recovered from the filtrate. The gallate modified castor oil, dissolved in sufficient ethylene glycol monoethyl ether to provide a 30-percent solution, was applied to mild steel plates that were tested as shown in Table IV. Some of the plates showed a tendency to form blotchy blue-black Fe complex-containing coatings presumably the result of poor wetting, but the addition of 3 percent of iron butoxide based on the weight of gallate modified castor oil overcame this defect.

*Example 4*

Fifty grams of a xylene solution containing 30 g. of a commercial dehydrated castor-modified bisphenol epoxy resin and 7 g. of propyl gallate were refluxed in the presence of 0.1 g. titanium isopropoxide for 3 hours at 225° C. After cooling the reacted mixture, 200 ml. of xylene was added. Filtration 2 days later gave 4 g. of unreacted propyl gallate and a filtrate containing 32 g. of the gallate modified dehydrated castor epoxy resin. The xylene was removed by heating under vacuum and a metal primer composition was prepared by dissolving 12 g. of the epoxy resin in 21 ml. aromatic naptha, 27 ml. of ethylene glycol monoethyl ether, and 0.5 ml. acetic acid promoter, which primer gave a streaky light-blue coating on mild steel. Addition of another 0.2 ml. acetic acid to the primer enabled fresh applications thereof to react with mild steel to form a soft, somewhat streaky blue-black coating that became fairly hard after 10 days. On exposure in the humidity cabinet, severe microblistering appeared after 1 day. The cold 1-percent alkali resistance (4 hours) was very good. A formulation in which 1 percent of the epoxy weight of iron butoxide was substituted for the acetic acid completely overcame the streaking tendency of the primer following its application to mild steel plates. Evolution results with the iron butoxide formulation are given in Table V.

*Example 5*

Decamethylene phthalate was prepared by reacting 9.7 g. (0.05 mole) dimethyl phthalate and 18 g. (slightly in excess of 0.01 mole) decamethylene glycol at 215° C. for 2 hours in the presence of 0.1 g. titanium isopropoxide. Upon heating to 100° C. at 1 mm. pressure, 3.8 ml. of methyl alcohol was distilled therefrom, leaving 24.5 g. of residual oil. On extracting the latter with 300 ml. benzene, 3.5 g. of a white solid material separated, the solution yielding 20 g. of a viscous light yellow liquid $n_D^{20}=1.058$. The latter was pot distilled at 145° C. and $10^{-3}$ mm. to yield a white solid distillate. The decamethylene phthalate (residual oil) 10 g. was reacted with 8.8 g. (0.04 mole) of propyl gallate at 230° C. for 1 hour in the presence of 0.1 g. titanium isopropoxide, about 1.5 ml. of propyl alcohol distillate being isolated. The crude decamethylene phthalate gallate product was extracted with three 60-ml. portions of hot benzene, and the pooled extracts left overnight to allow settling of the suspended oil. The total benzene isoluble product (11.5 g.) was very darkly colored and viscous. A 25-percent solution thereof in ethylene glycol monoethyl ether also containing iron butoxide reacted when applied to mild steel to form a hard, tack-free, blue-black coating which, however, gave a poor performance in the humidity cabinet.

*Example 6*

A polyethylene sebacate having hydroxyl end groups was prepared by reacting 25.8 g. (0.1 mole) diethylsebacate and 15 g. (0.25 mole) of ethylene glycol, i.e., excess, at 210° C. for 2¼ hours in the presence of 0.1 g. titanium isopropoxide; 10 ml. of ethanol distillate $$(n_D^{20}=1.363)$$

was collected, and distillation of the crude polyethylene sebacate gallate at about 100° C. and 1 mm. yielded 3.8 ml. of unreacted ethylene glycol. The solid residue was extracted with three 70-ml. portions of warm water, the insoluble residue being finally freed of solvent under vacuum. Extration of the water-insoluble product with three 60 ml. portions of hot petroleum ether gave about 1 g. of a liquid extract and 25.5 g. of cheesy pale yellow solid. Fifteen grams of the cheesy polyester were reacted with 10.6 g. (0.05 mole) of propyl gallate for 3 hours at 225° C. in the presence of 0.1 g. titanium isopropoxide, 1.5 g. of propyl alcohol distillate being recovered, corresponding to only 50 percent of the expected yield. The polyethylene sebacate gallate product was employed as a 30-percent solution in ethylene glycol monoethyl ether also containing iron butoxide equivalent to 1 percent by weight of the said polyester gallate. Evaluation results are shown in Table VI.

*Example 7*

Linseed oil, 29.2 g. and pyrogallol 26.5 g. were heated to obtain a homogeneous mixture. Then 0.3 g. of titanium isopropoxide catalyst was added and the reaction mixture was maintained at 200–230° C. for 1½ hours with constant stirring under nitrogen, 11 g. of unreacted pyrogallol then being recovered by extraction with water. Petroleum ether extraction of the water-insoluble residue removed about 3 g. of a soluble oil resembling linseed oil, leaving about 40 g. of a viscous, dark brown, petroleum ether-insoluble product which was then made up as a 30-percent solution in ethylene glycol monoethyl ether to which was then added 13-percent iron butoxide based on the pyrogallol modified linseed oil product. Test results with coatings applied to plates of mild steel are presented in Table VI. Evidence that the iron butoxide containing solution of pyrogallol-modified linseed oil had actually reacted with the steel substrate was provided by the fact that the films formed on the glass panels analyzed 2.7 percent iron whereas the corresponding films removed from the mild steel analyzed 5.1 percent Fe. Persistently tacky coatings were obtained when 1 percent acetic acid was used in lieu of iron butoxide.

*Example 8*

10.4 g. of commercial linoleic polyamide (amine value=80) and 113 g. of a xylol solution containing 67.8 g. (60%) of the linseed tung phthalic/glycerol alkyd of Example 1 were refluxed for 2 hours at 220–225° C. and then cooled under nitrogen. Then 6 g. of propyl gallate and 10 g. of xylol containing 0.1 g. of titanium isopropoxide were added and the mixture was heated for 3 hours at 225–230° C. Since the mixture was seen to still be cloudy, it was heated for 2 additional hours at 230–235° C. The xylol was removed and the gallate substituted linseed tung phthalic glycerol/polyamide product was dissolved in a 3:2 mixture of ethylene glycol monoethyl ether and naptha containing 1 percent acetic acid. Applications of this primer composition to freshly abraded mild steel plates provided blue-black tack-free films, but the flow properties were poor as indicated by the unevenness of the developed coloration. The addition to the primer of 1 percent of iron butoxide based on the resin improved both the flow properties (color uniformity) and the reactivity (color intensity), but the coatings had a soft surface that could be easily scratched. The coatings were not further evaluated.

TABLE I.—EVALUATION OF Fe/GALLATE MODIFIED LINSEED/TUNG PHTHALIC/GLYCEROL ALKYD COMPLEX COATING

| Test | Film aged at 25° C. for 7 days | Stoved (140° C./ 1 hour) (no prior ageing) |
|---|---|---|
| Appearance | Blue-black, tack-free film (glossy over abraded steel but matt on grit blasted steel). | As for unstoved but harder, some lightening of color noted in some panels. |
| Humidity (1,000 hours) | Very good protection, small patches over >10% of area of microblistering and traces of corrosion. | Excellent resistance to test. |
| Accelerated weathering (1,000 hours) | Result as above. | Very good protection, a few small patches of rusting (>10% of area). |
| Natural weathering (P.R.S. roof) | After 6 months very good protection, very few rust spots. | |
| Water, 2/3 immersion: | | |
| Cold (3 days) | No apparent effect. | No effect. |
| Boiling (1 hour) | Slight softening but no microblistering; no permanent loss of adhesion. | Result as above. |
| NaOH, 2/3 immersion: | | Slight microblistering and softening of coating but recovery of adhesion good. Color change noted (black to light brown). |
| Cold 1% (4 hours) | After 3 hours extensive color change (black to light brown) noted and loss of adhesion. | |
| Boiling 0.2% (1/4 hour) | Slight softening but no blistering, recovery of adhesion excellent. | No blistering observed but slight softening, recovery of adhesion and hardness of coating excellent. |
| 2% NH3 atmosphere (2 days) | Slight softening but no apparent microblistering recovery of hardness and adhesion excellent. | Very slight microblistering, and film softer after test. Recovery after several hours excellent. |
| Salt spray, 4% (1 week) | Performance of several panels tested varied from poor to fairly good. In best case about 25% of panel was affected by rust spots, fair amount of filiform corrosion over whole panel. | Loss of adhesion over 25% of area with rust beneath, fair amount of filiform corrosion. A duplicate panel was much less affected during this time but showed filiform corrosion; more rapid breakdown observed during 3 days further testing. |
| 4% Salt solution immersion (3 days) | After 2 days two fairly large patches of rust had appeared; at end of test, very significant blistering noted. | Signs of microblistering over relatively small area after 1 day; blistering gradually increased during test with rusting beneath blisters. |

TABLE II.—COMPARATIVE TESTS OF Fe/GALLATE MODIFIED LINSEED TUNG PHTHALIC GLYCEROL ALKYD COMPLEX COATING WITH CONVENTIONAL PRIMERS

| System | Test | | |
|---|---|---|---|
| | Humidity | Natural weathering on P.R.S. roof at Teddington (Suburban site) | Natural weathering at Hurst Castle (Coastal site) |
| Linseed/tung alkyd gallate (+Fe butoxide). | Very slight discoloration within 336 hours (14 days). Some rusting apparent after 500 hours (21 days). | Rapid appearance of water spots. Slight trace of rust after 2½ months. Slight rusting after a further 1¼ months. | Rapid rusting within 1 month. Total destruction within 2 months. |
| Linseed/tung alkyd gallate 20% red iron oxide (+Fe butoxide). | No improvement over the unpigmented alkyd gallate. | Rapid appearance of water spots. Slight trace of rust after 2½ months. No significant improvement over unpigmented gallate. A few small rust spots developed after a further 1¼ months. | Do. |
| Wash primer, butyral/chromate. | Rapid elution of chromate within a few days. Rusting commenced within 72 hours. | Rapid elution of chromate within a few days. Extensive rusting within 2½ months. | Rapid breakdown of film. About 75% of surface rusted within 2 months. |
| Zinc rich epoxy polyamide. | No effect in 21 days. | A few isolated rust spots developed within 2½ months. Slightly more rusting after further 1¼ months. | A few isolated rust spots developed within 2 months. |

NOTE.—Rainfall during 2½ and 3¾-months exposure was about 6″ and 9″, respectively.

TABLE III.—EVALUATION OF Fe2O3 PIGMENTED/Fe/GALLATE MODIFIED LINSEED/TUNG PHTHALIC/GLYCEROL ALKYD COMPLEX COATING (IRON BUTOXIDE)

| Test | Films first aged at 25° C. for 7 days | | |
|---|---|---|---|
| | 10% Fe2O3 | 40% Fe2O3 | 50% Fe2O3 |
| Humidity (1,000 hours) | Roughened surface due to very fine microblistering, but very good protection. Very slight rusting; good adhesion. | Result as opposite. | Good protection, one small rust spot. |
| Natural weathering (P.R.S. roof) | Slight rusting after 4½ months. | As opposite. | 20% of surface covered with rust after 4½ months. |
| Water: | | | |
| Cold (3 days) | No effect. | No effect. | No effect. |
| Boiling (1 hour) | As above. | Microblistering. | Slight microblistering. |
| NaOH: | | | |
| Cold 1% (4 hours) | Slight softening, good recovery. | Result as opposite. | Result as opposite. |
| Boiling 0.2% (¼ hour) | Very slight dissolution. | do. | Do. |
| Salt spray (5 days) | Severe rusting. | do. | Do. |

TABLE IV.—EVALUATION OF Fe/GALLATE MODIFIED CASTOR OIL COMPLEX COATING

| Test | Film aged at 25° C. for 7 days | Stoved (140° C./1 hour) (no prior aging) |
|---|---|---|
| Appearance | Blue-black, glossy and tack free | As for unstoved but harder. |
| Humidity (1,000 hours) | Very good protection, only traces of corrosion under microblisters. | The coating performance in both tests was notably improved. |
| Accelerated weathering (1,000 hours) | Very good protection, a few small rust spots noted and traces of microblistering. | |
| Natural weathering on P.R.S. roof | After 3 months, very slight rusting. After 4½ months, small rust patches noted. | No tests carried out. |
| Water: | | |
|   Cold (3 days) | No effect | No effect. |
|   Boiling (1 hour) | do | Do. |
| NaOH: | | |
|   Cold 1% (4 hours) | After 2 hours the film was changing color and softening with reduction in adhesion. No rusting. After 4 hours the film was soft and easily removed. | After 2 hours small amount of blistering. After 3 hours film softened around blisters and was easily removed (20% of area) but no rusting beneath blisters. |
|   Boiling 0.2% (¼ hour) | Slight softening and loss of adhesion over a small part of the film area. | No effect. |
| 2% NH₃ atmosphere (2 days) | Microblistering and softening, recovery good | Relatively less affected than unstoved. |
| Salt spray (1 week) | | Very appreciable corrosion, large rust spots over 30% of area. |

TABLE V

| Test | Dehydrated castor epoxy gallate |
|---|---|
| Appearance | A fairly hard black coating. |
| Accelerated weathering (1,000 hours) | Severe microblistering rapidly occurred. |
| Humidity cabinet (1,000 hours) | Microblistering occurred in 72 hours leading to extensive rusting. |
| Natural weathering on P.R.S. roof. | Slight brown color produced; about 25% of surface covered with small rust spots after 5 months. |
| Water: | |
|   Cold (3 days) | No effect. |
|   Boiling (1 hour) | Extensive microblistering and dissolution of film. |
| NaOH: | |
|   Cold 1% (4 hours) | No effect. |
|   Boiling 0.2% (¼ hour) | Microblistering. |
| Salt spray | Slight microblistering in 7 days rapidly followed by breakdown of film in 12 days. |

TABLE VI

| Test | Polyethylene sebacate gallate | Linseed/Pyrogallol |
|---|---|---|
| Appearance | Soft black coating | A rather soft black film. |
| Accelerated weathering (1,000 hours) | Slight rusting in 500 hours. Extensive rusting in 1,000 hours. | A brown colored film was quickly produced. Rusting started within 500 hours. 10% rusted after 1,000 hours. |
| Humidity cabinet (1,000 hours) | A few rust spots developed after 500 hours, half the surface rusted after 1000 hours. | Brown colored film produced. Rusting started within 500 hours. 10% rusted after 1,000 hours. |
| Natural weathering P.R.S. roof | Very slight rusting after 4½ months | Yellowish brown colored coating produced and a few rust spots after 5 months. |
| Water: | | |
|   Cold (3 days) | Film softened | Film softened. |
|   Boiling (1 hour) | Slight dissolution and softening of film | No effect. |
| NaOH: | | |
|   Cold 1% (4 hours) | Rapid dissolution of film | Film greatly softened; detached in parts. |
|   Boiling 0.2% (¼ hour) | do | Loss of gloss. |
| Salt spray | Disintegration in 5 days | Very rapid breakdown of film in 2½ days. |

We claim:

1. A process for improving the in situ formation per se of a diffusible, film-curing iron complex that results from the chemical reaction of a rust-free mild steel surface with a glycol ether solution selected from the group consisting of (a) ethylene glycol monoethyl ether and (b) substantially equal volume mixtures of said ether with high boiling naphtha said solution having dissolved therein as the iron complex-forming and film-forming component and constituting about 20–30 percent of the total weight of said solution a polyhydric phenol modified vegetable oil-based resin selected from the group consisting of (1) a gallate modified linseed/tung/phthalic glycerol alkyd, (2) gallate modified castor oil, (3) a gallate modified dehydrated castor bisphenol epichlorohydrin epoxy, (4) gallate modified polyethylene sebacate, (5) pyrogallol modified linseed oil, (6) a gallate-modified linseed/tung/phthalic glycerol polyamide, and (7) gallate modified decamethylene phthalate, said process comprising adding to a said glycol ether solution prior to applying the solution to said surface at least 1 percent to not more than 13 percent of iron butoxide based on the weight of the resin component.

2. Actively antioxidant primer compositions for application to rust-free mild steel comprising a 20–30 percent by weight solution in a glycol ether solution selected from the group consisting of ethylene glycol monoethyl ether and substantially equal volume mixtures of said ether and high boiling naphtha of a polyhydric phenol-modified vegetable oil-based resin selected from the group consisting of (1) a gallate-modified linseed/tung/phthalic glycerol alkyd, (2) gallate-modified castor oil, (3) a gallate-modified dehydrated castor bisphenol epichlorohydrin epoxy, (4) gallate-modified polyethylene sebacate, (5) pyrogallol-modified linseed oil, (6) a gallate-modified linseed/tung phthalic glycerol polyamide, and (7) gallate-modified decamethylene phthalate, and for improving the cure of films thereof applied to a surface of said mild steel, from 1 percent to not more than 13 percent of iron butoxide based on the weight of the resin component.

3. A composition according to claim 2 wherein the resin is a gallate-modified linseed/tung phthalic glycerol alkyd, the iron butoxide concentration is 3 percent based on the alkyd, and wherein the glycol ether solution is an equal volume mixture of ethylene glycol monoethyl ether and high boiling naphtha.

4. A freshly abraded mild steel panel coated with the composition of claim 3.

5. A composition according to claim 2 wherein the resin is gallate-modified castor oil whose concentration in the glycol ether is 30 percent and wherein the concentration of iron butoxide based on the weight of the gallate-modified castor oil is 3 percent, said glycol ether being ethylene glycol monoethyl ether.

6. A composition according to claim 2 wherein the resin is gallate modified dehydrated castor bisphenol epichlorohydrin epoxy, the iron butoxide is present at the level of 1 percent based on the weight of the resin, and the glycol ether solution is a substantially equal volume mixture of ethylene glycol monoethyl ether and high boiling naphtha, the concentration of said resin in said solution being 20 percent by weight thereof.

7. A composition according to claim 2 wherein the glycol ether solution is ethylene glycol monoethyl ether and wherein the resin dissolved therein is gallate-modified polyethylene sebacate in a concentration of 30 percent, and wherein the iron butoxide is present at the level of 1 percent based on the weight of the resin.

8. A composition according to claim 2 wherein the glycol ether solution is ethylene glycol monoethyl ether and wherein the resin dissolved therein is pyrogallol modified linseed oil in a concentration of 30 percent, and wherein the iron butoxide is present at the level of 13 present based on the weight of the resin.

9. A composition according to claim 2 wherein the resin is gallate-modified linseed/tung phthalic glycerol polyamide, the iron butoxide is present at the level of 1 percent based on the weight of the resin, and the glycol ether solution is a mixture of equal volumes of ethylene glycol monoethyl ether and high boiling naphtha.

10. A composition according to claim 2 wherein the resin is gallate-modified decamethylene phthalate, and the iron butoxide is present at the level of 1 percent based on the weight of the resin.

References Cited by the Examiner
UNITED STATES PATENTS

| | | | |
|---|---|---|---|
| 2,424,730 | 7/1947 | Balassa | 106—14 |
| 2,544,391 | 3/1951 | Marling | 106—14 |
| 2,844,559 | 7/1958 | Parker | 106—14 |

ALEXANDER H. BRODMERKEL, *Primary Examiner.*

L. HAYES, *Assistant Examiner.*